United States Patent [19]

Reinartz

[11] Patent Number: 4,662,688
[45] Date of Patent: May 5, 1987

[54] VEHICLE HYDRAULIC BRAKE SYSTEM

[75] Inventor: Hans D. Reinartz, Frankfurt am Main, Fed. Rep. of Germany

[73] Assignee: ITT Industries, Inc., New York, N.Y.

[21] Appl. No.: 659,100

[22] Filed: Oct. 9, 1984

[30] Foreign Application Priority Data

Oct. 21, 1983 [DE] Fed. Rep. of Germany ....... 3338251

[51] Int. Cl.$^4$ .......................... B60T 8/44; B60T 13/68
[52] U.S. Cl. .................... 303/114; 303/119; 60/577; 60/578; 60/553
[58] Field of Search ............... 303/114, 116, 119, 115, 303/100, 113, 91, 92, 10, 52; 188/345; 60/577, 578, 576, 574, 553

[56] References Cited

U.S. PATENT DOCUMENTS

| | | | |
|---|---|---|---|
| 4,415,210 | 11/1983 | Belart et al. | 303/92 |
| 4,416,491 | 11/1983 | Belart et al. | 303/113 |
| 4,440,454 | 4/1984 | Belart et al. | 303/119 |

Primary Examiner—Douglas C. Butler
Assistant Examiner—Alvin Oberley
Attorney, Agent, or Firm—James B. Raden; William J. Michals

[57] ABSTRACT

The present invention starts from a vehicle hydraulic brake system comprising a master cylinder (2) actuatable by a hydraulic power booster (1) and containing a working chamber (12, 21), to which latter wheel brakes (36, 37, 38, 39) are connected by way of valves (40, 41) controllable by a slip control electronics. On control action, pressure fluid can be taken from the wheel brakes (36, 37, 38, 39) through the valves (40, 41) and can be replenished out of the presser chamber (5) of the hydraulic power booster (1) by way of the working chamber of the hydraulic power booster by way of the working chamber (12, 21). On communication of the working chamber (12, 21) with the pressure chamber (5) of the hydraulic power booster (1), simultaneously, a resetting sleeve (11) is pressurized in the brake's release direction which is penetrated by a master cylinder piston (10) and which serves to limit the stroke of the brake pedal (6). In particular with a view to simplifying the design of the braking pressure generator (1, 2), it is proposed that an annular housing chamber (15), which is confined by the end face of the resetting sleeve (11) that is remote from the working chamber (12), is normally isolated from an unpressurized supply reservoir (18) and is in communication to said supply reservoir (18) exclusively during brake slip control.

8 Claims, 1 Drawing Figure

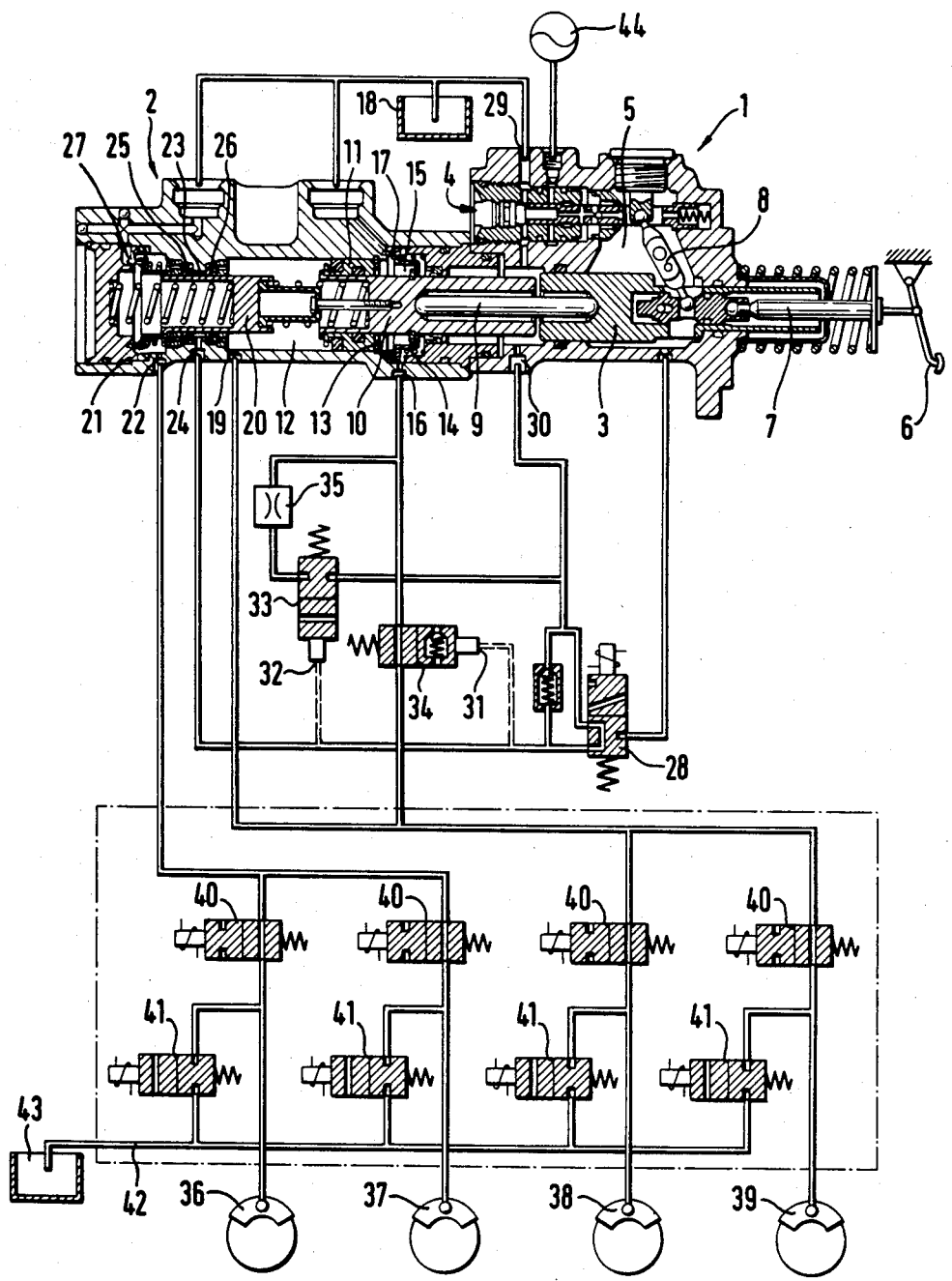

VEHICLE HYDRAULIC BRAKE SYSTEM

BACKGROUND OF THE INVENTION

The present invention relates to a vehicle hydraulic brake system comprising a master cylinder actuatable by a hydraulic power booster and containing a working chamber, to which wheel brakes are connected by way of valve means controllable by a slip control electronics, in which system on control action pressure fluid can be taken from the wheel brakes through the valve means and can be replenished out of the pressure chamber of the hydraulic power booster by way of the working chamber, wherein during communication of the working chamber with the pressure chamber, a resetting sleeve is pressurized in the brake's release direction which is penetrated by a master cylinder piston and which serves to limit the stroke of the brake pedal.

A device incorporating the preceding features is known from German printed and published patent application No. 3040562. This known brake system comprises a hydraulic power booster which, in turn, disposes of a pedal-actuatable brake valve. A pressure proportional to the respective actuating force can be metered from a pressure fluid reservoir into a pressure chamber of the hydraulic power booster, what, in excess of a minimum pressure of response in the pressure chamber of the hydraulic power booster, will finally result in displacement of the booster piston in the actuating direction. An axial displacement of the booster piston is first transmitted onto a first master cylinder piston of a tandem master cylinder so that a first working chamber of the tandem master cylinder will be pressurized. Said first working chamber of the tandem master cylinder is confined by a second master cylinder piston which will be shifted hydraulically in the actuating direction so that likewise a second working chamber of the tandem master cylinder will be pressurized. Wheel brakes of an automotive vehicle are connected to the working chambers of the tandem master cylinder.

Inserted in the connections between the working chambers of the tandem master cylinder and the wheel brakes are valve means which are controllable by a slip control electronics and which serve to interrupt the hydraulic connections between the working chambers and the wheel brakes. The wheel brakes of the automotive vehicle are in communication with an unpressurized supply reservoir via normally closed valve means which can be opened by the slip control electronics, so that pressure fluid is removable from the wheel brakes what allows to reduce the effective braking pressure and to cause re-acceleration of the vehicle wheels in the event of a control action.

The pistons of the tandem master cylinder are sleeve-sealed, and in each case one annular surface of the master cylinder pistons remote from the working chamber is during control action adapted to be acted upon by the dynamic pressure of the pressure chamber of the hydraulic power booster. Pressure fluid which is removed from the wheel brakes during brake slip control will be replenished this way out of the pressure chamber of the hydraulic power booster via the working chambers of the tandem master cylinder.

On exposure of the master cylinder pistons to the dynamic pressure, a resetting sleeve is simultaneously acted upon in the brake's release direction, in which sleeve one of the master cylinder pistons is sealedly guided. Said resetting sleeve will displace on dynamic pressurization so far in the brake's release direction that an annular collar of the master cylinder piston moves into abutment on the pedal-side annular surface of the resetting sleeve so that the axial displacement of the master cylinder pistons in the actuating direction is limited.

In the brake system described, the relatively complicated design has to be regarded as less favorable on the whole. Furthermore, a dynamic pressurization of the resetting sleeve may ensue abrupt resetting movements of the brake pedal, whereby driving comfort is lessened.

Therefore, it is an object of the present invention to improve upon a vehicle hydraulic brake system of the species initially referred to with constructively simple means such as to delay the resetting movement of the master cylinder piston.

SUMMARY OF THE INVENTION

This object will be achieved by the present invention in that an annular housing chamber, which is confined by the end face of the resetting sleeve remote from the working chamber, is normally isolated from an unpressurized supply reservoir and will have communication with said supply reservoir exclusively during brake slip control. In an improvement upon the subject matter of the application, it is arranged for that a throttle is inserted into the connection to the supply reservoir. A like arrangement has as a consequence that, on control action, pressure fluid escapes relatively slowly due to the throttle from the annular housing chamber to the unpressurized supply reservoir. That is to say, on pressurization of the working chamber of the tandem master cylinder, the resetting movement of the resetting sleeve does not take place abruptly, but with a retardation defined substantially by the throttle. It is furthermore arranged for to insert into the connection to the supply reservoir a slip-responsively actuatable two-way/two-position valve which switches to an open position as soon as a slip control electronics senses a critical slip value at one or at several of the vehicle wheels. Preferably, said two-way/two-position valve is actuatable pressure-responsively.

Additionally, it is advantageous if the annular housing chamber is in communication with the working chamber of the master cylinder via a two-way/two-position valve which is pressure-responsively actuatable to assume a closed position. Consequently, in the brake's release position and during normal braking operations (without brake slip control), like pressures prevail on both sides of the resetting sleeve so that the resetting sleeve does not have any influence on the pressure generated in the working chamber. In addition thereto, the resetting sleeve can be displaced by the master cylinder piston without putting up appreciable resistance thereagainst. According to an improvement of the subject matter of the application, a check valve becomes effective in the two-way/two-position valve in the closed position thereof, which check valve is adapted to open in the presence of a pressure gradient from the annular housing chamber to the working chamber. The control ports of the pressure-responsively actuatable two-way/two-position valves are connectable to the pressure chamber of the hydraulic power booster via a three-way/two-position valve. Said three-way/two-position valve is, in turn, controllable by the slip control electronics and will assume the working position on recognition of a critical slip value at one or at several of the vehicle wheels. The control ports of the two-way/two-position valves are connected to an annular chamber of the master cylinder, while a hydraulic communication can be established from the pressure chamber of the hydraulic power booster to the working chamber of the master cylinder via the annular chamber and via a sealing sleeve acting as a check valve. Pressure fluid which is removed from the brake circuits during brake slip control this way can be replenished particularly easily via the sealing sleeve out of the pressure chamber of the hydraulic power booster.

BRIEF DESCRIPTION OF THE DRAWING

One embodiment will be described in more detail hereinbelow by way of a principal view illustrated in the accompanying drawing wherein the single drawing FIGURE illustrates a vehicle hydraulic brake system in accordance with the present invention.

DETAILED DESCRIPTON

In the drawing, reference numeral 1 designates a hydraulic power booster by which a tandem master cylinder 2 is pressurizable. Said hydraulic power booster 1 comprises a booster piston 3 and a brake valve 4, the axes of the booster piston 3 and of the brake valve 4 being arranged in parallel to one another. The end face of the booster piston which is close to a pressure chamber 5 of the hydraulic power booster 1 receives a piston rod 7 actuatable by a brake pedal 6. Supported at the piston rod 7 is the lower end of a lever actuation 8, the upper end of which is in connection with the brake pedal. The booster piston 3 of the hydraulic power booster 1 is in the brake-actuating direction in positive engagement with a first master cylinder piston 10 via a push rod 9. Said master cylinder piston 10 penetrates a resetting sleeve 11, the said resetting sleeve 11 and the end face of the first master cylinder piston remote from the pedal serving to confine a first working chamber 12 of the tandem master cylinder. In turn, the resetting sleeve is sealedly guided in the cylinder bore of the tandem master cylinder 2. The axial position of the resetting sleeve in the brake's release direction is bounded by a stop 13 formed fast with the housing. Besides, a stop 14 is shaped at the first master cylinder piston 10 which stop is movable into abutment on the pedal-side end face of the resetting sleeve 11. Said pedal-side end face of the resetting sleeve 11 further serves to confine an annular housing chamber 15. Said annular housing chamber 15 is in hydraulic communication with a housing port 16. In addition hereto, the first master cylinder piston 10 serves to actuate a valve 17 which, after the first master cylinder piston 10 has performed a small travel, will interrupt a connection between an unpressurized supply reservoir 18 and the first working chamber of the tandem master cylinder 2. The first working chamber 12 of the tandem master cylinder 2 is in permanent hydraulic communication with a housing port 19.

The first working chamber 12 of the tandem master cylinder 2 is among others confined by a second master cylinder piston 20 which is hydraulically slidable into a second working chamber 21 of the tandem master cylinder, branching off therefrom is a housing port 22. The portion of the cylinder bore of the tandem master cylinder guiding the second master cylinder piston 20 is provided with an annular housing chamber 23 having hydraulic communication with a housing port 24. On either side of the annular chamber 23, sealing sleeve 25, 26 are arranged through which pressure fluid can be supplied to the working chambers 12, 21. Arranged at the second master cylinder piston 20 is likewise a valve 27 which in design and mode of operation corresponds to the valve 17 at the first master cylinder piston 10.

Connected to the pressure chamber 5 of the hydraulic power booster is a three-way/two-position valve 28 through which normally there is hydraulic communication between the unpressurized supply reservoir 18 and the housing port 24 and the annular chamber 23, respectively, by way of housing ports 29, 30 and corresponding pressure fluid channels and lines. Besides, in the inactive position of the three-way/two-position valve 28, two control ports 31, 32 of two two-way/two-position valves 33, 34 are unpressurized.

The two-way/two-position valve 33 normally (without slip control) assumes a closed position and is inserted in the connection between the housing port 16 and the annular housing chamber 15, respectively, and the unpressurized supply reservoir 18.

Further, a throttle 35 is inserted into this hydraulic communication. The two-way/two-position valve 33 is controllable pressure-responsively, while the control port 32 is normally unpressurized. The two-way/two-position valve 34 is arranged in a connection between the housing port 16 and the first working chamber 12 of the tandem master cylinder and normally has adopted its open position. In the working position of the two-way/two-position valve 34, a check valve is effective which enables exclusively a fluid flow from the annular housing chamber 15 to the first working chamber 12 of the tandem master cylinder 2.

Wheel brakes 36, 37 are connected via corresponding pressure lines to the housing port 22 and to the second working chamber 21 of the tandem master cylinder 2, respectively. Accordingly, the housing port 19 is in communication with wheel brakes 38, 39. Connected upstream of each wheel brake 36, 37, 38, 39 is an inlet valve 40 controllable by a slip control electronics, which said inlet valves will normally (without slip control) adopt an open position and will be switchable to assume a closed position on issuance of corresponding control signals of the slip control electronics. Connected directly to the wheel brakes 36, 37, 38, 39 are in each case outlet valves 41 which normally assume a closed position and which are able to be changed over to a switch position in which the wheel brakes 36, 37, 38, 39 are connectable to a return reservoir 43 via one joint return line 42.

The mode of operation of the described brake system will be explained in more detail hereinbelow, starting from the brake's release position to be gather from the drawing. It will be presupposed furthermore that a pressure accumulator 44 utilized for the auxiliary pressure supply is in a sufficient charging condition. In this operating condition, the pressure chamber 5 of the hydraulic power booster 1 is via the brake valve 4 in hydraulic communication with the unpressurized supply reservoir 18. When the brake pedal 6 is applied by force, the piston rod 7 will displace in the actuating direction while the booster piston 3 is immovable first, so that, via the lever actuation 8 supported at the push rod 7, a control slider of the brake valve 4 will be displaced, as a result whereof pressure fluid out of the pressure accumulator 44 propagates via the brake valve 4 into the pressure chamber 5 of the hydraulic power booster 1. The pressure in the pressure chamber 5 of the hydraulic power booster 1 corresponds to the actuating force exerted on the brake pedal 6 and, after having exceeded a minimum pressure of response which is essentially determined by the friction cased by the seals, causes the booster piston 3 to displace in the actuating direction. Displacement of the booster piston 3 will be transmitted mechanically via the push rod 9 onto the first master cylinder piston 10, which, after a relatively small displacement travel, closes the valve 17, thus interrupting a hydraulic connection between the first working chamber 12 and the unpressurized supply reservoir 18. On continued displacement of the booster piston 3 and of the first master cylinder piston 10, respectively, a hydraulic pressure will develop in the first working chamber 12 of the tandem master cylinder 2 which pressure finally causes displacement of likewise the second master cylinder piston 20 in the direction of the second working chamber 21, so that a substantially like amount of pressure develops in the working chambers 12, 21. On such a brake actuation, there is free hydraulic communication via the two-way/two-position valve 34 between the first working chamber 12 and the annular housing chamber 15, so that the resetting sleeve 11 is pressure-balanced and has no influence on the braking pressure generation. Under certain circumstances, the resetting sleeve 11 can be caused to also displace in the actuating direction via the stop 14 formed at the first master cylinder piston 10, a like displacement being counteracted by no appreciable displacing forces.

When the braking pressure in one or in several of the wheel brakes 36, 37, 38, 39 will be increased by a corresponding force application on the brake pedal 6 so much that at least one vehicle wheel has a critical slip value, the three-way/two-position control valve will be switched by the non-illustrated slip control electronics to assume the closed position. Caused by this, there is now a hydraulic connection between the pressure chamber 5 of the hydraulic power booster 1 and the housing port 24 and the annular chamber 23, respectively. Further, the control ports 31, 32 of the two-way/two-position valves will be pressurized so that likewise the valves 33, 34 assume their working position. In this operating position of the hydraulic brake system described, there is communication from the annular housing chamber 15 via the throttle 35 and the two-way/two-position valve 33 being in it open position to the unpressurized supply reservoir 18 so that the resetting sleeve 11 is exposed on one side to pressure out of the first working chamber 12, as a result whereof the resetting sleeve 11 will finally displace in the brake's release direction until the pedal-side annular surface of the resetting sleeve 11 has moved into abutment on the stop 13. In this arrangement, it may easily occur that the first master cylinder piston 10 is also displaced in the brake's release direction via the stop 14 shaped at the piston 10 so that a corresponding resetting movement can be sensed at the brake pedal 6.

It shall be assumed for instance that the vehicle wheel assigned to the wheel brake 36 is the first to have a critical slip value. This will have as a consequence that the inlet valve 40 assigned to the wheel brake 36 will be switched by the non-illustrated slip control electronics to assume a closed position, in which the wheel brake 36 is isolated from the second working chamber 21 of the tandem master cylinder. If a like interruption of the pressure delivery to the wheel brake 36 will not suffice to re-accelerate the respective vehicle wheel sufficiently, corresponding control command will be issued to the outlet valve 41, in response to which the wheel brake 36 will be connected via the return line 42 with the return reservoir 43. As now pressure fluid is taken from the wheel brake 36, the effective braking pressure decreases accordingly, re-acceleration of the corresponding vehicle wheel being caused thereby. The preceding explanations make it clear that, during brake slip control, pressure fluid is taken from the brake circuits, while replenishment of the pressure fluid removed is effected out of the pressure chamber 5 of the hydraulic power booster 1 via the sealing sleeves 25, 26.

During the action of brake release, the courses of motion described will be reversed until the brake's release position discernible from the drawing will be accomplished again. Pressure decrease out of the chamber 15 takes place via the check valve integrated in the two-way/two-position valve 34.

Under certain circumstances, the throttle 35 may be dispensed within the brake system described, if the throttling effect of the two-way/two-position valve 33 that is determined by design is sufficiently great in the valve's opened position.

What is claimed is:

1. A vehicle hydraulic brake system actuated by a brake pedal operable in brake application and brake release directions, said system comprising a master cylinder actuatable by a hydraulic power booster and containing a working chamber, to which wheel brakes are connected by way of valve means controllable by a slip control electronics, in which system in response to a slip control action signal pressure fluid can be taken from the wheel brakes through the valve means and can be replenished out of a pressure chamber of the hydraulic power booster by way of a connection between the pressure chamber and the working chamber, a resetting sleeve slidably mounted in said working chamber, said sleeve surrounding and being penetrated by a master cylinder piston and second valve means responsive to said signal and connecting said pressure chamber with said working chamber, said working chamber pressurizing an end face of the resetting sleeve that faces the working chamber and thereby enabling displacement of the resetting sleeve in opposition to the movement of the master cylinder piston, a stop means mounted on said master cylinder which is movable into engagement with said resetting sleeve and which serves to limit the stroke of the brake pedal, wherein an annular housing chamber (15) is confined by an end face of the resetting sleeve (11) that is remote from the working chamber (12), and wherein said annular chamber (15) is isolated from an unpressurized supply reservoir (18) by way of a valve (17) connected between said annular chamber (15) and said supply reservoir (18) which is actuated by said master cylinder piston during braking and wherein said annular chamber (15) is in communication with said supply reservoir (18) exclusively during brake slip control by way of third valve means (33) responsive to slip control.

2. A hydraulic brake system as claimed in claim 1, wherein a throttle (35) is inserted into a connection between the supply reservoir (18) and said annular housing chamber (15).

3. A hydraulic brake system as claimed in claim 2, wherein said third valve means including a slip-responsively actuatable two-way/two-position valve (33) inserted into said connection to the supply reservoir (18) and said annular chamber (15).

4. A hydraulic brake system as claimed in claim 3, wherein the two-way/two-position valve (33) is actuatable responsive to fluid pressure from said second valve means (28).

5. A hydraulic brake system as claimed in claim 4, wherein the annular housing chamber (15) has a connection to the working chamber (12, 21) of the master cylinder (2) by way of a two-way/two position valve (34) connected between said annular housing chamber (15) and said working chamber (12, 21) and which is aapted to be switched to a closed position responsive to fluid pressure from said second valve means (28).

6. A hydraulic brake system as claimed in claim 5, wherein the closed position of the two-way/two-position valve (34) a check valve in the valve (34) is effective which is adapted to open in the presence of a pressure gradient from the annular housing chamber (15) to the working chamber (12).

7. A hydraulic brake system as claimed in claim 5, wherein control ports (31, 32) of the two-way/two-position valves (33, 34) are connectable to the pressure chamber (5) of the hydraulic power booster (1) said second valve means which includes a three-way/two-position valve (28).

8. A hydraulic brake system as claimed in claim 6, wherein control ports (31, 32) of the two-way/two position valves (33, 34) are connected to annular chamber (23) of the master cylinder (2), from which chamber a hydraulic connection can be established to the working chamber (12, 21) via a sealing sleeve (25, 26) acting as a check valve.

* * * * *